United States Patent
Yoshida et al.

(10) Patent No.: US 11,313,009 B2
(45) Date of Patent: Apr. 26, 2022

(54) HOT-ROLLED STEEL SHEET AND METHOD FOR MANUFACTURING SAME

(71) Applicant: NIPPON STEEL CORPORATION, Tokyo (JP)

(72) Inventors: Mitsuru Yoshida, Tokyo (JP); Nobusato Kojima, Tokyo (JP); Yuuki Kanzawa, Tokyo (JP); Kohhei Kamiya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 75 days.

(21) Appl. No.: 16/624,771

(22) PCT Filed: Jul. 6, 2018

(86) PCT No.: PCT/JP2018/025687
§ 371 (c)(1),
(2) Date: Dec. 19, 2019

(87) PCT Pub. No.: WO2019/009410
PCT Pub. Date: Jan. 10, 2019

(65) Prior Publication Data
US 2021/0140005 A1    May 13, 2021

(30) Foreign Application Priority Data
Jul. 7, 2017  (JP) ............................. JP2017-133889

(51) Int. Cl.
| | | |
|---|---|---|
| B22D 11/00 | (2006.01) | |
| C21D 9/46 | (2006.01) | |
| C21D 8/02 | (2006.01) | |
| C22C 38/00 | (2006.01) | |
| C22C 38/02 | (2006.01) | |
| C22C 38/06 | (2006.01) | |
| C22C 38/42 | (2006.01) | |
| C22C 38/44 | (2006.01) | |
| C22C 38/46 | (2006.01) | |
| C22C 38/48 | (2006.01) | |
| C22C 38/50 | (2006.01) | |
| C22C 38/54 | (2006.01) | |
| C22C 38/58 | (2006.01) | |

(52) U.S. Cl.
CPC ............ *C21D 9/46* (2013.01); *C21D 8/0205* (2013.01); *C21D 8/0226* (2013.01); *C22C 38/001* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2004/0244877 A1* | 12/2004 | Yokoi | C21D 8/0478 148/320 |
| 2013/0153091 A1 | 6/2013 | Fujita et al. | |
| 2013/0319582 A1 | 12/2013 | Yokoi et al. | |
| 2014/0000765 A1 | 1/2014 | Nozaki et al. | |
| 2014/0014236 A1* | 1/2014 | Nozaki | C22C 38/001 148/504 |
| 2014/0014237 A1 | 1/2014 | Yokoi et al. | |
| 2014/0030546 A1 | 1/2014 | Suwa et al. | |
| 2014/0044989 A1 | 2/2014 | Toda et al. | |
| 2014/0087208 A1 | 3/2014 | Toda et al. | |
| 2014/0110022 A1 | 4/2014 | Sano et al. | |
| 2014/0242415 A1 | 8/2014 | Azuma et al. | |
| 2015/0017471 A1 | 1/2015 | Shuto et al. | |

(Continued)

FOREIGN PATENT DOCUMENTS

| | | |
|---|---|---|
| JP | 2008-255484 A | 10/2008 |
| JP | 2009-84648 A | 4/2009 |

(Continued)

OTHER PUBLICATIONS

"Metallic materials—Hole expanding test", JIS Z 2256, 2010, total 28 pages.
"Metallic materials—Sheet and strip—Determination of plastic strain ratio", JIS Z 2254, 2008, total 41 pages.
"Metallic materials—Tensile testing—Method of test at room temperture", JIS Z 2241, 2011, total 169 pages.
"Method for Charpy pendulum impact test of metallic materials", JIS Z 2242, 2018, total 70 pages.
"Steels-Micrographic determination of the apparent grain size", JIS G 0551, 2013, total 90 pages.

(Continued)

*Primary Examiner* — Seth Dumbris
*Assistant Examiner* — Kim S. Horger
(74) *Attorney, Agent, or Firm* — Birch, Stewart, Kolasch & Birch, LLP

(57) ABSTRACT

A hot-rolled steel sheet according to an aspect of the present invention has a predetermined chemical composition, in which, in a location at a depth of ¼ of a sheet thickness from a surface, an area ratio of ferrite is 10% to 55%, a total area ratio of bainite and martensite is 45% to 90%, a total area ratio of the ferrite, the bainite, and the martensite is 90% or more, an average crystal grain size is 12.0 μm or less, in a texture measured in a sheet thickness central portion, a maximum pole density of orientation groups of {100} <011>, {211} <011>, {311} <011>, {110} <011>, and {332} <113> is 8.0 or less, a total of pole densities of {211} <011> and {332} <113> is 10.0 or less, and a tensile strength is 950 MPa or more.

10 Claims, No Drawings

(56) References Cited

U.S. PATENT DOCUMENTS

| | | |
|---|---|---|
| 2015/0027593 A1 | 1/2015 | Hata et al. |
| 2017/0044638 A1 | 2/2017 | Yokoi et al. |
| 2018/0327878 A1 | 11/2018 | Toyoda et al. |

FOREIGN PATENT DOCUMENTS

| | | |
|---|---|---|
| JP | 2014-205890 A | 10/2014 |
| JP | 2016-8310 A | 1/2016 |
| TW | 201303038 A1 | 1/2013 |
| TW | 201335383 A1 | 9/2013 |
| WO | WO 2012/014926 A1 | 2/2012 |
| WO | WO 2012/133540 A1 | 10/2012 |
| WO | WO 2012/133563 A1 | 10/2012 |
| WO | WO 2012/133636 A1 | 10/2012 |
| WO | WO 2012/141265 A1 | 10/2012 |
| WO | WO 2012/141290 A1 | 10/2012 |
| WO | WO 2012/144567 A1 | 10/2012 |
| WO | WO 2012/161241 A1 | 11/2012 |
| WO | WO 2012/161248 A1 | 11/2012 |
| WO | WO 2013/047819 A1 | 4/2013 |
| WO | WO 2013/125399 A1 | 8/2013 |
| WO | WO 2015/162932 A1 | 10/2015 |
| WO | WO 2017/085841 A1 | 5/2017 |

OTHER PUBLICATIONS

International Search Report for PCT/JP2018/025687 dated Sep. 18, 2018.
Office Action for TW 107123504 dated Apr. 30, 2019.
Written Opinion of the International Searching Authority for PCT/JP2018/025687 (PCT/ISA/237) dated Sep. 18, 2018.

* cited by examiner

HOT-ROLLED STEEL SHEET AND METHOD FOR MANUFACTURING SAME

TECHNICAL FIELD OF THE INVENTION

The present invention relates to a hot-rolled steel sheet and a method for manufacturing the same. In more detail, the present invention relates to a hot-rolled steel sheet having excellent workability which is preferred as a material used for applications such as cars, home appliances, mechanical structures, and construction and a method for manufacturing the same.

Priority is claimed on Japanese Patent Application No. 2017-133889, filed on Jul. 7, 2017, the content of which is incorporated herein by reference.

RELATED ART

For steel sheets provided as a material for structural members of transportation machines including cars or a variety of industrial machines, a variety of characteristics such as workability such as strength, elongation, or stretch flangeability, low-temperature toughness, or uniformity of those characteristics are demanded.

Particularly, for steel sheets used for components such as an inner sheet member, a structural member, and a suspension member of a car, stretch flangeability, burring workability, ductility, fatigue durability, impact resistance, corrosion resistance, and the like are demanded. For steel sheets used for the above-described members, there is a demand for exhibiting the above-described material characteristics and a high strength in a high-dimensional and well-balanced manner. In addition, steel sheets used for the above-described members need to have a characteristic not allowing the steel sheets to be easily broken even when impacted by collision after being formed and attached to a car as a component of a member. Particularly, in cold climates in which steel sheets are used at a low temperature, members become likely to embrittle, and thus there is also a need for improving the low-temperature toughness of the steel sheets in order to ensure impact resistance. The low-temperature toughness is a characteristic prescribed by vTrs (Charpy fracture appearance transition temperature) or the like. For thin steel sheets used for a component of the above-described members, not only excellent workability but also low-temperature toughness are demanded as extremely important characteristics.

As a steel sheet from which excellent ductility can be obtained, a Dual Phase steel sheet (hereinafter, DP steel) configured of a composite structure of soft ferrite and hard martensite is known. DP steel is excellent in terms of ductility, but is cracked due to the generation of voids in the interface between ferrite and martensite which have significantly different hardness and is thus poor in terms of hole expansibility in some cases.

Patent Document 1 proposes a high-strength hot-rolled steel sheet having a tensile strength of 980 MPa or more in which the area ratios of bainitic ferrite, martensite, and bainite are set to 90% or more, 5% or less, and 5% or less respectively, thereby improving elongation and hole expansibility (stretch flangeability). However, in the invention described in Patent Document 1, bainitic ferrite is used as a main body, and thus there is a case where sufficient elongation cannot be obtained.

Patent Document 2 proposes a hot-rolled steel sheet having a tensile strength of 980 MPa or more in which the area ratio of bainite is set to 90% or more, then, the remainder is configured of one or more selected from martensite, austenite, and ferrite, as the mother phase structure, and the amount of cementite dispersed in the structure and the average grain size are controlled, thereby improving hole expansibility (stretch flangeability). However, in the invention described in Patent Document 2, the hot-rolled steel sheet is wound at 330° C. to 470° C. which is a transition boiling region, and thus there is a case where characteristics vary due to the variation in the temperature in the sheet surface.

Patent Document 3 proposes a hot-rolled steel sheet having excellent fatigue characteristics in which a ferrite fraction is 50% to 95%, a fraction of a hard second phase made up of martensite and residual austenite is 5% to 50%, the interrelationship among the amounts of carbide-forming elements or the relationship between the carbide-forming element and the amount of C is set in a predetermined range, and then the average grain size of a precipitate and the fraction of the precipitate are prescribed. However, in the invention described in Patent Document 3, soft ferrite is used as a main body, and the strength is ensured by the precipitation strengthening of a fine carbide, and thus there is a case where sufficient low-temperature toughness cannot be obtained.

Patent Document 4 proposes a high-strength hot-rolled steel sheet having a tensile strength of 980 MPa or more in which martensite is 20% to 60%, ferrite is 40% or more, the total area ratio of the martensite and the ferrite is 90% or more, and the average grain size of the martensite and the ratio between the hardness of the martensite and the hardness of the ferrite is set in a predetermined range. However, in the invention described in Patent Document 4, a necessary time is short in the final phase of finishing rolling, and thus the texture develops, and there is a case where sufficient elongation and stretch flangeability cannot be obtained.

PRIOR ART DOCUMENT

Patent Documents

[Patent Document 1] Japanese Unexamined Patent Application, First Publication No. 2008-255484
[Patent Document 2] Japanese Unexamined Patent Application, First Publication No. 2014-205890
[Patent Document 3] Japanese Unexamined Patent Application, First Publication No. 2009-84648
[Patent Document 4] PCT International Publication No. WO. 2017/085841

DISCLOSURE OF THE INVENTION

Problems to be Solved by the Invention

The present invention has been made in consideration of the above-described circumstances, and an object of the present invention is to provide a hot-rolled steel sheet having a high strength and being excellent in terms of elongation, stretch flangeability, and low-temperature toughness, and a manufacturing method enabling the stable manufacturing of the hot-rolled steel sheet.

Means for Solving the Problem

The present inventors found that a hot-rolled steel sheet having a high strength and being excellent in terms of elongation, stretch flangeability, and low-temperature toughness can be manufactured by controlling the texture and the microstructure of the hot-rolled steel sheet through the optimization of the chemical composition and the manufacturing condition of the hot-rolled steel sheet.

The gist of the present invention is as described below.

[1] A hot-rolled steel sheet according to an aspect of the present invention having a chemical composition containing, by mass %:
C: 0.02% to 0.20%,
Si: 0.005% to 2.00%,
Mn: 1.30% to 2.40%,
P: 0.100% or less,
S: 0.0100% or less,
sol. Al: 0.001% to 1.00%,
Ti: 0.030% to 0.200%,
N: 0.0010% to 0.0100%,
Nb: 0% to 0.100%,
V: 0% to 0.50%,
Mo: 0% to 0.50%,
Cu: 0% to 1.00%,
Ni: 0% to 1.00%,
Cr: 0% to 2.00%,
B: 0% to 0.0100%,
Ca: 0% to 0.0100%,
Mg: 0% to 0.0100%, and
REM: 0% to 0.0100%
with a remainder being Fe and an impurity,
in which, in a location at a depth of ¼ of a sheet thickness from a surface, an area ratio of ferrite is 10% to 55%, a total area ratio of bainite and martensite is 45% to 90%, a total area ratio of the ferrite, the bainite, and the martensite is 90% or more, an average crystal grain size is 12.0 μm or less,
in a texture measured in a sheet thickness central portion, a maximum pole density of orientation groups of {100} <011>, {211} <011>, {311} <011>, {110} <011>, and {332} <113> is 8.0 or less, a total of pole densities of {211} <011> and {332} <113> is 10.0 or less, and
a tensile strength is 950 MPa or more.

[2] The hot-rolled steel sheet according to [1],
in which the chemical composition may contain, by mass %, one or more selected from the group consisting of
Nb: 0.001% to 0.100%,
V: 0.005% to 0.50%,
Mo: 0.001% to 0.50%,
Cu: 0.02% to 1.00%,
Ni: 0.02% to 1.00%,
Cr: 0.02% to 2.00%, and
B: 0.0001% to 0.0100%.

The hot-rolled steel sheet according to [1] or [2],
in which the chemical composition may contain, by mass %, one or more selected from the group consisting of
Ca: 0.0002% to 0.0100%,
Mg: 0.0002% to 0.0100%, and
REM: 0.0002% to 0.0100%.

The hot-rolled steel sheet according to any one of [1] to [3], in which an absolute value |Δr| of an in-plane anisotropy of an r value may be 0.35 or less.

Here, $\Delta r = (r_0 + r_{90} - 2 \times r_{45})/2$ $r_0$ represents the r value in a rolling direction, $r_{90}$ represents the r value in a rolling orthogonal direction, and $r_{45}$ represents the r value in a 45° direction with respect to the rolling direction. The r value refers to a Lankford value.

A method for manufacturing a hot-rolled steel sheet according to another aspect of the present invention in which, in manufacturing of the hot-rolled steel sheet according to any one of [1] to [4], multi-pass hot rolling is carried out on a slab or a steel piece having the chemical composition according to any one of [1] to [3], thereby manufacturing the hot-rolled steel sheet, in which a heating temperature in the multi-pass hot rolling is set to 1,150° C. to 1,350° C., when a finish temperature is represented by FT in a unit of ° C., a total rolling reduction at higher than the FT+50° C. to the FT+150° C. is set to 50% or more, a total rolling reduction at the FT to the FT+50° C. is set to 40% to 80%, a time necessary for rolling at the FT to the FT+50° C. is set to 0.5 to 10.0 seconds, in individual temperature ranges of higher than the FT+50° C. to the FT+150° C. and the FT to the FT+50° C., two or more-pass rolling is carried out, finish rolling is completed by setting the FT to equal to or higher than Ar$_3$ which is obtained from Expression (1), equal to or higher than TR which is obtained from Expression (2), and 1,100° C. or lower, then, water cooling is initiated within 3.0 seconds, an average cooling rate at the FT to 750° C. is set to 20° C./second or faster, a dwell time at a temperature range of 750° C. to 600° C. is set to 5 to 20 seconds, and an average cooling rate at a temperature range from 600° C. to a cooling stop temperature of lower than Ms which is obtained from Expression (3) is set to 20° C./second or faster.

$$Ar_3 \,(°C.) = 901 - 325 \times [C] + 33 \times [Si] - 92 \times [Mn] + 287 \times [P] + 40 \times [Al] \quad (1)$$

$$TR \,(°C.) = 800 + 700 \times [Ti] + 1000 \times [Nb] \quad (2)$$

$$Ms \,(°C.) = 561 - 474 \times [C] - 33 \times [Mn] - 17 \times [Ni] - 21 \times [Mo] \quad (3)$$

Here, the respective element symbols in Expressions (1) to (3) indicate the amounts of the respective elements by mass %.

In the method for manufacturing the hot-rolled steel sheet according to [5], the average cooling rate from the Ms to the cooling stop temperature of lower than the Ms may be set to 80° C./second or faster.

[7] In the method for manufacturing the hot-rolled steel sheet according to [5] or [6], after the completion of the finish rolling, water cooling may be initiated within 0.3 seconds, and cooling, in which the average cooling rate from the FT to the FT−40° C. is 100° C./second or faster, may be carried out.

[8] In the method for manufacturing the hot-rolled steel sheet according to [7], a step of carrying out cooling, in which the average cooling rate from the FT to the FT −40° C. is 100° C./second or faster, may be carried out between rolling stands.

Effects of the Invention

According to the present invention, it is possible to provide a hot-rolled steel sheet having a high strength and being excellent in terms of elongation, stretch flangeability, and low-temperature toughness, and a manufacturing method enabling the stable manufacturing of the hot-rolled steel sheet. When the hot-rolled steel sheet according to the present invention is used as a material of a component for an inner plate member, a structural member, a suspension member, or the like of a car, it is easy to work the hot-rolled steel sheet into a component shape, and the hot-rolled steel sheet is capable of withstanding the use in an extremely cold climate, and thus industrial contribution is extremely significant.

Embodiments of the Invention

A hot-rolled steel sheet according to the present embodiment (hereinafter, simply referred to as the steel sheet in some cases) and a method for manufacturing the same will be described below in detail. In the following description, "%" regarding the chemical composition of steel indicates "mass %" in all cases.

<Chemical Composition of Steel>

(C: 0.02% to 0.20%)

C has an action of increasing the strength of steel by generating a hard phase such as martensite or bainite, or a Ti carbide. When the amount of C is less than 0.02%, it is difficult to sufficiently exhibit the above-described action. Therefore, the amount of C is set to 0.02% or more and preferably set to 0.04% or more. On the other hand, when the amount of C is more than 0.20%, the stretch flangeability or low-temperature toughness of the steel sheet significantly deteriorates. In addition, ferritic transformation after hot rolling is significantly delayed, and it becomes difficult to obtain a desired amount of ferrite. Furthermore, the deterioration of weldability becomes significant. Therefore, the amount of C is set to 0.20% or less. The amount of C is preferably 0.15% or less, more preferably 0.12% or less, and still more preferably 0.10% or less.

(Si: 0.005% to 2.00%)

Si has an action of accelerating ferritic transformation and suppressing the precipitation of cementite. In addition, Si also has an action of improving the strength of steel by solid solution strengthening. When the amount of Si is less than 0.005%, it becomes difficult to exhibit the above-described action. Therefore, the amount of Si is set to 0.005% or more. The amount of Si is preferably 0.40% or more and more preferably 0.80% or more. On the other hand, when the amount of Si is more than 2.00%, the surface properties of the steel sheet significantly deteriorates due to the oxidation of the surface in a hot rolling step. Therefore, the amount of Si is set to 2.00% or less. The amount of Si is preferably 1.50% or less and more preferably 1.30% or less.

(Mn: 1.30% to 2.40%)

Mn has an action of increasing the strength of steel by solid solution strengthening and the enhancement of hardenability. When the amount of Mn is less than 1.30%, it becomes difficult to obtain a strength of the steel sheet being 950 MPa or more. Therefore, the amount of Mn is set to 1.30% or more. The amount of Mn is preferably 1.50% or more. On the other hand, when the amount of Mn is more than 2.40%, ferritic transformation in a cooling process after hot rolling is excessively delayed, and thus it becomes difficult to obtain a desired amount of ferrite. In addition, due to the hardening of martensite and bainite, a crack is easily generated in the vicinity of the boundary between martensite and bainite and soft ferrite, and thus the stretch flangeability or toughness of the steel sheet degrades.

The present inventors found that, when a large amount of Mn is contained, there is a case where the stretch flangeability degrades together with an increase in the in-plane anisotropy of the r value of the steel sheet. The reason therefor is not clear, but is assumed to result from the precipitation of a large amount of MnS attributed to a large amount of Mn contained and the generation of local variation in recrystallization during hot rolling and ferritic transformation after finish rolling that is attributed to the segregation of Mn. From the above description, the amount of Mn is set to 2.40% or less in order to obtain a desired amount of ferrite and stably manufacture a hot-rolled steel sheet having excellent stretch flangeability. The amount of Mn is preferably 2.10% or less, more preferably 2.00% or less, and still more preferably 1.90% or less.

(P: 0.100% or Less)

P is an element contained in steel as an impurity and has an action of degrading the stretch flangeability or low-temperature toughness of the hot-rolled steel sheet. Therefore, the amount of P is set to 0.100% or less. The amount of P is preferably 0.060% or less, more preferably 0.040% or less, and still more preferably 0.020% or less. P is incorporated from a raw material as an impurity, and the lower limit thereof does not need to be particularly limited, but the amount of P is preferably smaller as long as the stretch flangeability or the low-temperature toughness is ensured. However, when the amount of P is excessively decreased, the manufacturing cost increases. From the viewpoint of the manufacturing cost, the lower limit of the amount of P is preferably 0.001% and more preferably 0.005%.

(S: 0.0100% or Less)

S is an element contained as an impurity and has an action of degrading the workability of the hot-rolled steel sheet. Therefore, the amount of S is set to 0.0100% or less. The amount of S is preferably 0.0080% or less, more preferably 0.0060% or less, and still more preferably 0.0030% or less. S is incorporated from the raw material as an impurity, and the lower limit thereof does not need to be particularly limited; however, from the viewpoint of ensuring workability, the amount of S is preferably smaller. However, when the amount of S is excessively decreased, the manufacturing cost increases. From the viewpoint of the manufacturing cost, the lower limit of the amount of S is preferably 0.0001%, more preferably 0.0005%, and still more preferably 0.0010%.

(sol. Al: 0.001% to 1.00%)

Al has an action of cleaning steel in a steel-making phase by deoxidation and accelerating ferritic transformation. When the amount of sol. Al is less than 0.001%, it becomes difficult to exhibit the above-described action. Therefore, the amount of sol. Al is set to 0.001% or more. The amount of sol. Al is preferably 0.01% or more and more preferably 0.02% or more. On the other hand, when the amount of sol. Al is set to more than 1.00%, the effect of the above-described action is saturated, and an increase in the cost is caused. Therefore, the amount of sol. Al is set to 1.00% or less. The amount of sol. Al is preferably 0.80% or less and more preferably 0.60% or less. sol. Al indicates acid-soluble Al.

(Ti: 0.030% to 0.200%)

Ti has an action of refining the structure by forming a Ti nitride. In addition, Ti has an action of precipitating a carbide and strengthening steel. When the amount of Ti is less than 0.030%, it becomes difficult to exhibit the above-described action. Therefore, the amount of Ti is set to 0.030% or more. The amount of Ti is preferably 0.040% or more and more preferably 0.060% or more. On the other hand, when Ti is excessively contained, a coarse nitride or carbide is generated, and thus the stretch flangeability or toughness of the steel sheet degrades. Furthermore, Ti also has an action of increasing the recrystallization temperature of austenite, and thus, when Ti is excessively contained, the recrystallization temperature becomes excessively high, and the anisotropy of the r value increases, and thus the stretch flangeability of the steel sheet degrades. Therefore, the amount of Ti is set to 0.200% or less. The amount of Ti is preferably 0.160% or less and more preferably 0.140% or less.

(N: 0.0010% to 0.0100%)

N has an action of refining the microstructure by forming a Ti nitride to suppress the coarsening of austenite during the reheating of a slab and during hot rolling. When the amount of N is less than 0.0010%, it becomes difficult to exhibit the above-described action. Therefore, the amount of N is set to 0.0010% or more. The amount of N is preferably 0.0015% or more and more preferably 0.0020% or more. On the other hand, when the amount of N is more than 0.0100%, a coarse Ti nitride is formed, and the stretch flangeability of the steel sheet deteriorates. Therefore, the amount of N is set to 0.0100%. The amount of N is preferably 0.0060% or less.

(Nb: 0% to 0.100%)

Nb is an arbitrary element. Nb has effects for suppressing the coarsening of the crystal grain size of the hot-rolled steel sheet, refining the ferrite grain size, and increasing the strength of the hot-rolled steel sheet by the precipitation strengthening of NbC. In the case of obtaining these effects, the amount of Nb is preferably set to 0.001% or more. The amount of Nb is more preferably 0.005% or more. On the other hand, when the amount of Nb exceeds 0.100%, the above-described effects are saturated, and there is a case where an increase in the rolling load of hot finish rolling is caused. Therefore, the amount of Nb is preferably set to 0.100% or less. The amount of Nb is preferably 0.060% or less and more preferably 0.030% or less.

(V: 0% to 0.50%)

V is an arbitrary element. V has effects for increasing the strength of the hot-rolled steel sheet by being solid-slutionized in steel and precipitation-strengthening the steel sheet by being precipitated as a carbide, a nitride, a carbonitride, or the like in steel. In the case of obtaining these effects, the amount of V is preferably set to 0.005% or more. The amount of V is more preferably 0.01% or more. On the other hand, when the amount of V exceeds 0.50%, there is a case where the degradation of the toughness of the steel sheet is caused. Therefore, the amount of V is preferably set to 0.50% or less. The amount of V is more preferably 0.30% or less.

(Mo: 0% to 0.50%)

Mo is an arbitrary element. Mo has effects for increasing the hardenability of steel and increasing the strength of the hot-rolled steel sheet by forming a carbide or a carbonitride. In the case of obtaining these effects, the amount of Mo is preferably set to 0.001% or more. The amount of Mo is more preferably 0.005% or more. On the other hand, when the amount of Mo exceeds 0.50%, there is a case where the crack sensitivity of a slab enhances. Therefore, the amount of Mo is preferably set to 0.50% or less. The amount of Mo is more preferably 0.30% or less.

(Cu: 0% to 1.00%)

Cu is an arbitrary element. Cu has effects for improving the toughness of steel and increasing the strength. In the case of obtaining these effects, the amount of Cu is preferably set to 0.02% or more. The amount of Cu is more preferably 0.08% or more. On the other hand, when Cu is excessively contained, there is a case where the weldability of the steel sheet degrades. Therefore, the amount of Cu is preferably set to 1.00% or less. The amount of Cu is more preferably 0.50% or less and still more preferably 0.30% or less.

(Ni: 0% to 1.00%)

Ni is an arbitrary element. Ni has an effect for improving the toughness of steel and an effect for increasing the strength. In the case of obtaining these effects, the amount of Ni is preferably set to 0.02% or more. The amount of Ni is more preferably 0.10% or more. On the other hand, when Ni is excessively contained, the alloying cost is high, and there is a case where the toughness of a welded heat-affected zone in the steel sheet deteriorates. Therefore, the amount of Ni is preferably set to 1.00% or less. The amount of Ni is more preferably 0.50% or less and still more preferably 0.30% or less.

(Cr: 0% to 2.00%)

Cr is an arbitrary element. Cr has an effect for accelerating the generation of martensite or the like by enhancing the hardenability of steel. In the case of obtaining this effect, the amount of Cr is preferably set to 0.02% or more. The amount of Cr is more preferably 0.05% or more. On the other hand, when Cr is excessively contained, ferritic transformation in the cooling process after hot rolling is excessively delayed, and thus there is a case where it becomes difficult to obtain a desired amount of ferrite. Therefore, the amount of Cr is preferably set to 2.00% or less. The amount of Cr is more preferably 1.50% or less, still more preferably 1.00% or less, and particularly preferably 0.50% or less.

(B: 0% to 0.0100%)

B is an arbitrary element. B has effects for increasing the grain boundary strength and improving the toughness of steel. In addition, B has an effect for precipitation-strengthening steel by a nitride. In the case of obtaining these effects, the amount of B is preferably set to 0.0001% or more. The amount of B is more preferably 0.0003% or more. On the other hand, even when more than 0.0100% of B is contained, the above-described effects are saturated, and the alloying cost increases. Therefore, the amount of B is preferably set to 0.0100% or less. The amount of B is more preferably 0.0050% or less, still more preferably 0.0030% or less, and particularly preferably 0.0010% or less.

(Ca: 0% to 0.0100%)

Ca is an arbitrary element. Ca has an effect for dispersing a number of fine oxides in molten steel and refining the metallographic structure of the steel sheet. In addition, Ca has an effect for improving the stretch flangeability of the hot-rolled steel sheet by fixing S in the molten steel as spherical CaS to suppress the generation of an elongation inclusion such as MnS. In the case of obtaining these effects, the amount of Ca is preferably set to 0.0002% or more. The amount of Ca is more preferably 0.0005% or more. On the other hand, when the amount of Ca exceeds 0.0100%, CaO in steel increases, and there is a case where the toughness of the steel sheet is adversely affected. Therefore, the amount of Ca is preferably set to 0.0100% or less. The amount of Ca is more preferably 0.0050% or less and still more preferably 0.0030% or less.

(Mg: 0% to 0.0100%)

Mg is an arbitrary element. Similar to Ca, Mg has effects for suppressing the formation of coarse MnS by forming an oxide or a sulfide in molten steel and refining the structure of the steel sheet by dispersing a number of fine oxides. In the case of obtaining these effects, the amount of Mg is preferably set to 0.0002% or more. The amount of Mg is more preferably 0.0005% or more. On the other hand, when the amount of Mg exceeds 0.0100%, an oxide in steel increases, and the toughness of the steel sheet is adversely affected. Therefore, the amount of Mg is preferably set to 0.0100% or less. The amount of Mg is more preferably 0.0050% or less and still more preferably 0.0030% or less.

(REM: 0% to 0.0100%)

REM is an arbitrary element. Similar to Ca, REM also has effects for suppressing the formation of coarse MnS by forming an oxide or a sulfide in molten steel and refining the structure of the steel sheet by dispersing a number of fine oxides. In the case of obtaining these effects, the amount of REM is preferably set to 0.0002% or more. The amount of REM is more preferably 0.0005% or more. On the other hand, when the amount of REM exceeds 0.0100%, an oxide in steel increases, and there is a case where the toughness of the steel sheet is adversely affected. Therefore, the amount of REM is preferably set to 0.0100% or less. The amount of REM is more preferably 0.0050% or less and still more preferably 0.0030% or less.

Here, REM (rare earth metal) refers to a total of 17 elements made up of Sc, Y, and lanthanoid. In the present embodiment, the amount of REM refers to the total amount of these elements.

The chemical composition of the hot-rolled steel sheet according to the present embodiment is made up of, in addition to the above-described elements, Fe and an impurity. The impurity in the present embodiment refers to a component that is included in the raw material or incorporated in a manufacturing process and is not intentionally added to steel.

<Steel Structures Other Than Texture>

The hot-rolled steel sheet according to the present embodiment prescribes the area ratio of ferrite, the total area ratio of "bainite and martensite", the total area ratio of "ferrite, bainite, and martensite", and the range of the average crystal grain size in a location at a depth of ¼ of the sheet thickness from the surface of the steel sheet. Here, the reason for prescribing steel structures in the location at a depth of ¼ of the sheet thickness from the surface of the steel sheet regarding the area ratios or crystal grain sizes of ferrite, bainite, and martensite is that this depth location is the middle point between the surface of the steel sheet and the sheet thickness central location and, regarding structures other than the texture, steel structures in the location represent the steel structure of the hot-rolled steel sheet (indicate the average steel structure of the entire hot-rolled steel sheet).

In the present embodiment, ferrite includes, in addition to polygonal ferrite, acicular ferrite and quasi-polygonal ferrite, but does not include ferrite configuring a pearlite structure or bainitic ferrite configuring a bainite structure. In the present embodiment, bainitic ferrite is treated as bainite.

Hereinafter, the reasons for prescribing the respective ranges will be described.

(Area Ratio of Ferrite: 10% to 55%)

Soft ferrite is a structure necessary to obtain a favorable ductility of the steel sheet. When the area ratio of ferrite is less than 10%, the elongation of the steel sheet degrades. Therefore, the area ratio of ferrite is set to 10% or more. The area ratio of ferrite is preferably 15% or more. On the other hand, when ferrite is excessively precipitated, it becomes difficult to obtain a tensile strength of 950 MPa or more with the chemical composition of the steel sheet according to the present embodiment. Therefore, the area ratio of ferrite is set to 55% or less. The area ratio of ferrite is preferably less than 40%, more preferably 38% or less, and particularly preferably 36% or less.

(Total Area Ratio of Bainite and Martensite: 45 to 90%)

Hard bainite or martensite is a structure necessary to obtain a high strength. When the total area ratio of bainite and martensite is less than 45%, it is difficult to obtain a tensile strength of 950 MPa or more with the chemical composition of the steel sheet according to the present embodiment. Therefore, the total area ratio of bainite and martensite is set to 45% or more. The total area ratio of bainite and martensite is preferably more than 60%, more preferably 62% or more, and still more preferably 64% or more. In the present embodiment, martensite also includes tempered martensite that has been subjected to automatic tempering, and bainite includes bainitic ferrite. On the other hand, when the total area ratio of bainite and martensite exceeds 90%, the area ratio of ferrite lacks, the workability of the steel sheet cannot be obtained, and the elongation degrades. Therefore, the total area ratio of bainite and martensite is set to 90% or less. The total area ratio of bainite and martensite is preferably 85% or less.

(Total Area Ratio of Ferrite, Bainite, and Martensite: 90% or More (Other Structures: 10% or Less))

As structures other than ferrite, bainite, and martensite that are arbitrary structures, there are residual austenite, pearlite, grain boundary cementite, and the like. When the area ratio of the other structures exceeds 10%, these structures serve as a cracking origination, and the stretch flangeability or low-temperature toughness of the steel sheet degrades. Therefore, the area ratio of the other structures is set to 10% or less. The area ratio of the other structures is preferably 8% or less and more preferably 5% or less. The area ratio of the other structures may be 0%. In other words, the total area ratio of ferrite, martensite, and bainite is set to 90% or more, is preferably 92% or more and more preferably 95% or more, and may be 100%.

Residual austenite among the other structures is transformed into extremely hard martensite by a pre-working such as punching, and thus the stretch flangeability of the steel sheet is significantly deteriorated. Therefore, among the other structures, particularly, the area ratio of residual austenite is preferably set to 3% or less. The area ratio of the residual austenite is more preferably 2% or less, still more preferably 1% or less, and particularly preferably 0%.

(Average Crystal Grain Size is 12.0 µm or Less)

When the grain size of ferrite and the average crystal grain size of a block size of martensite or bainite is coarse, the fracture surface unit at the time of fracture becomes large, and the low-temperature toughness of the steel sheet degrades. Therefore, the average crystal grain size is set to 12.0 µm or less. The average crystal grain size is preferably 10.0 µm or less and more preferably 7.0 µm or less. The average crystal grain size is preferably smaller, and thus the lower limit is not particularly limited. However, in ordinary hot rolling, it is technically difficult to refine crystal grains so that the average crystal grain size becomes below 1.0 µm, and thus the lower limit is generally 1.0 µm or more.

In the present embodiment, the average crystal grain size refers to the average of crystal grain sizes for which, in materials having a bcc crystal structure, that is, ferrite, bainite, martensite, and pearlite, a region having a crystal orientation difference of 15° or more and a circle-equivalent diameter of 0.3 µm or more is defined as a crystal grain, and the crystal grain size of residual austenite or grain boundary cementite is not included in the average crystal grain size.

In the present embodiment, the average crystal grain size and the area ratios of the respective structures are obtained by the scanning electron microscope (SEM) observation and the electron back scattering diffraction (EBSD) of the structures in the location at a depth of ¼ of the sheet thickness from the surface of the steel sheet in a cross section of the steel sheet parallel to a rolling direction and the sheet thickness direction using an EBSD analysis instrument configured of a thermal field-emission-type scanning electron microscope and an EBSD detector.

In the SEM observation, since residual austenite is present between the laths or blocks and the packets of bainite and martensite, it is difficult to differentiate residual austenite from bainite and martensite. Therefore, the area ratios of ferrite, "bainite, martensite, (and residual austenite)" and residual structures (pearlite and grain boundary cementite) are measured by incorporating residual austenite into bainite and martensite in the measurement.

In EBSD analysis, in a region having the location at a depth of ¼ of the sheet thickness at the center and a size of 200 μm in the rolling direction and 100 μm in the sheet thickness direction, crystal orientation information is measured at intervals of 0.2 μm separately for fcc and bcc, regions having a crystal orientation difference of 15° or more and a circle-equivalent diameter of 0.3 μm or more are defined as crystal grains using accessory software of the EBSD analysis instrument ("OIM Analysis (registered trademark)" manufactured by AMETEK. Inc.), the area ratio of fcc (residual austenite) is obtained, and the average crystal grain size of bcc is obtained using a method used in [Expression 1].

The area ratio of fcc (residual austenite) obtained by the EBSD analysis is subtracted from the area ratio of "bainite, martensite, (and residual austenite)" obtained by the SEM observation, thereby obtaining the area ratios of bainite and martensite.

Regarding the average crystal grain size of bcc, a value computed from an expression shown in [Expression 1] is obtained. In the expression, D represents the average crystal grain size, N represents the number of crystal grains included in the evaluation region of the average crystal grain size, Ai represents an area of the $i^{th}$ (i=1, 2, ..., N) crystal grain, and di represents the circle-equivalent diameter of the $i^{th}$ crystal grain.

$$D = \frac{\sum_{i=1}^{N} Ai \times di}{\sum_{i=1}^{N} Ai}$$

A boundary having a crystal orientation difference of 15° or more is mainly a ferrite grain boundary and a block boundary of martensite and bainite. In a method for manufacturing a ferrite grain size according to JIS G 0551:2013, there is a case where a grain size is computed even for a ferrite grain having a crystal orientation difference of less than 15°, and furthermore, the block of martensite or bainite is not computed. Therefore, as the average crystal grain size in the present embodiment, a value obtained by the EBSD analysis is employed.

<Texture>

The hot-rolled steel sheet according to the present embodiment prescribes, in a sheet thickness central portion of the steel sheet, the maximum pole density of orientation groups of {100} <011>, {211} <011>, {311} <011>, {110} <011>, and {332} <113> and the total of the pole densities of {211} <011> and {332} <113>. The sheet thickness central portion in the present embodiment refers to a range of approximately 1/10 of the sheet thickness in a front direction and a rear direction of the steel sheet respectively from a sheet thickness central location (a location of a depth of ½ of the sheet thickness from the surface of the steel sheet). For example, when the sheet thickness of the steel sheet is 2 mm, the sheet thickness central portion refers to a range of approximately 100 μm in the front surface and the rear surface respectively across the sheet thickness central location as a boundary.

The reason for prescribing a texture in the sheet thickness central portion is that the texture in the sheet thickness central portion and mechanical characteristics favorably correlate with each other. The reason is not determined, but the present inventors assume as described below. In the hot-rolled steel sheet, due to friction between a roll and the steel sheet during rolling, shear deformation occurs in opposite directions in the front and rear of the steel sheet, and plane strain deformation occurs in the sheet thickness central portion. The texture of the hot-rolled steel sheet changes in the sheet thickness direction in response to these deformations, and the directions of the shear deformation in the front and rear of the steel sheet are opposite to each other, and thus, in the texture, symmetric orientations develop in the front and rear. Therefore, the influences of the texture on mechanical characteristics are offset in the front and rear, and thus the texture in the sheet thickness central portion and the mechanical characteristics favorably correspond to each other.

(Maximum pole density of orientation groups (main orientation groups) of {100} <011>, {211} <011>, {311} <011>, {110} <011>, and {332} <113> in sheet thickness central portion: 8.0 or less)

As main orientations that develop in the texture in the sheet thickness central portion of the hot-rolled steel sheet, there are {100} <011>, {211} <011>, {311} <011>, {110} <011>, and {332} <113>. The development of only one of these orientation groups increases the in-plane anisotropy of a variety of mechanical characteristics such as tensile strength, yield strength, elongation, and r value of the hot-rolled steel sheet and particularly significantly degrades the stretch flangeability that deforms in the entire circumferential direction. Therefore, in the present embodiment, it is important to suppress the development of all of these orientation groups to make the texture more random. In the present embodiment, the pole densities of the respective orientation groups of {100} <011>, {211} <011>, {311} <011>, {110} <011>, and {332} <113> in the sheet thickness central portion are computed, and the maximum value thereof is obtained. The maximum pole density being low means that the proportion of structures in random orientations is high and thus means that the texture in the orientation groups of {100} <011>, {211} <011>, {311} <011>, {110} <011>, and {332} <113> is not in a developed state. Therefore, the maximum pole density of the above-described orientation groups is set to 8.0 or less. The maximum pole density of the above-described orientation groups is preferably 7.0 or less and more preferably 6.0 or less. The maximum pole density of the above-described orientation groups is 1.0 in a case where the hot-rolled steel sheet does not include any texture, and thus the maximum pole density is more desirably close to 1.0.

The pole density can be obtained from crystal orientation information by the EBSD analysis and is a synonym of an X-ray random intensity ratio.

(Total of Pole Densities of {211} <011> and {332} <113> in Sheet Thickness Central Portion: 10.0 or Less)

The development of, among the above-described orientation groups, particularly, {211} <011> and {332} <113> significantly degrades the stretch flangeability of the steel sheet. Therefore, the total of the pole densities of {211} <011> and {332} <113> is set to 10.0 or less. The total of the pole densities of {211} <011> and {332} <113> is more preferably 8.0 or less. The total of the pole densities is preferably small; however, the pole densities of the respective orientation groups are 1.0 in a case where the hot-rolled steel sheet does not include any texture, and thus the pole densities are more preferably a value close to 2.0.

{hkl} indicates a crystal plane parallel to a rolled surface, and <uvw> indicates a crystal direction parallel to the rolling direction. That is, {hkl} <uvw> indicates a crystal in which {hkl} is oriented in a normal direction to the sheet surface and <uvw> is oriented in the rolling direction.

In addition, in the present embodiment, the pole densities of the respective crystal orientations in the sheet thickness central portion are obtained by ODF analysis using harmonic series expansion after measuring information of the crystal grain orientations of 1,000 or more bcc's, separately for fcc and bcc, in the sheet thickness central portion (the range of approximately 1/10 of the sheet thickness in the front direction and the rear direction of the steel sheet respectively from the sheet thickness central location (the location of a depth of ½ of the sheet thickness from the surface of the steel sheet)) by EBSD analysis using an instrument manufactured by combining a scanning electron microscope and an EBSD analysis instrument and OIM Analysis (registered trademark) manufactured by AMETEK. Inc.

<Mechanical Characteristics>

(Tensile Strength: 950 MPa or More)

The hot-rolled steel sheet according to the present embodiment, being obtained by the control of the steel structures and the texture, has a high strength and is excellent in terms of low-temperature toughness, elongation, and stretch flangeability. However, when the tensile strength of the hot-rolled steel sheet is small, an effect for reducing the weight of a car body or improving the stiffness is weak. Therefore, the tensile strength (TS) of the hot-rolled steel sheet according to the present embodiment is set to 950 MPa or more. The tensile strength is preferably 980 MPa or more.

The elongation of the hot-rolled steel sheet is evaluated using the percentage total extension at fracture (El) prescribed in JIS Z 2241:2011, and TS×El that serves as an index of the balance between strength and elongation is preferably 14,000 MPa·% or more and more preferably 15,000 MPa·% or more.

The stretch flangeability of the hot-rolled steel sheet is evaluated using the limiting hole expansion ratio ($\lambda$) prescribed in JIS Z 2256:2010 in addition to |$\Delta$R| described below, and TS×$\lambda$ that serves as an index of the balance between strength and stretch flangeability is preferably 50,000 MPa·% or more and more preferably 55,000 MPa·% or more.

Regarding the low-temperature toughness of the hot-rolled steel sheet, the vTrs (fracture appearance transition temperature) in the Charpy impact test prescribed in JIS Z 2242:2005 is preferably −40° C. or lower.

In the hot-rolled steel sheet according to the present embodiment, from the viewpoint of obtaining a sufficient stretch flangeability, (the absolute value of $\Delta$r) that is an index of the in-plane anisotropy of the r value is preferably small. The in-plane anisotropy |$\Delta$r| of the r value is preferably 0.40 or less, more preferably 0.35 or less, still more preferably 0.30 or less, and particularly preferably 0.25 or less. The in-plane anisotropy of the r value is preferably small and most preferably zero.

$\Delta$r is represented by $(r_0+r_{90}-2\times r_{45})/2$, $r_0$ represents the r value in the rolling direction, $r_{90}$ represents the r value in a rolling orthogonal direction, and $r_{45}$ represents the r value in a 45° direction with respect to the rolling direction. In addition, the r value refers to a Lankford value.

<Manufacturing Method>

Subsequently, the reason for limiting conditions for manufacturing the hot-rolled steel sheet according to the present embodiment will be described.

The present inventors confirmed that the hot-rolled steel sheet according to the present embodiment can be obtained using a manufacturing method including hot rolling and cooling as described below.

First, multi-pass hot rolling is carried out on a slab having the above-described chemical composition, thereby manufacturing a hot-rolled steel sheet. The slab that is subjected to the hot rolling may be a slab obtained by continuous casting or casting and blooming or may be a slab obtained by additionally carrying out a hot working or a cold working on the above-described slab. The multi-pass hot rolling can be carried out using a reverse mill or a tandem mill, and, from the viewpoint of industrial productivity, a tandem mill is preferably used in at least several stages from the end.

(Heating Temperature in Hot Rolling: 1,150° C. to 1,350° C.)

When the temperature of the slab or the steel piece that is subjected to hot rolling is lower than 1,150° C., the solutionizing of a Ti carbide becomes insufficient, and the strength or workability of the steel sheet degrades. On the other hand, when the temperature of the slab or the steel piece that is subjected to hot rollling is higher than 1,350° C., there is a case where thick scale is generated and thus the yield is decreased or significant damage is imparted to a heating furnace at the time of heating the slab or the steel piece in the heating furnace. Therefore, the temperature of the slab or the steel piece that is subjected to hot rolling is set to 1,150° C. to 1,350° C.

The temperature of the slab or the steel piece that is subjected to hot rolling needs to be in the above-described temperature range, and a steel ingot or a steel piece having a temperature of lower than 1,150° C. may be subjected to hot rolling after being charged into a heating furnace and heated up to the above-described temperature range or a slab obtained by continuous casting or a steel piece obtained by blooming may be subjected to hot rolling without carrying out a heating treatment thereon while holding a high-temperature state of 1,150° C. or higher.

(Total Rolling Reduction at Higher Than FT+50° C. to FT+150° C.: 50% or More)

In the present embodiment, when a finish temperature is represented by FT in a unit of ° C., recrystallized austenite grains in the steel sheet can be refined by increasing the total rolling reduction of hot rolling at higher than FT+50° C. to FT+150° C. In order to refine recrystallized austenite grains in the steel sheet, the total rolling reduction at higher than FT+50° C. to FT+150° C. is set to 50% or more. When the total rolling reduction in the above-described temperature range is less than 50%, austenite is not sufficiently refined, and thus the structure after transformation becomes coarse, and, subsequently, recrystallization between rolling passes during rolling at FT to FT+50° C. is delayed, whereby the texture after transformation develops. The total rolling reduction at higher than FT+50° C. to FT+150° C. is preferably high; however, industrially, there is a limit at approximately 90%, and thus the total rolling reduction may be set to 90% or less.

(Total Rolling Reduction at FT to FT+50° C.: 40% to 80%,)

(Time Necessary for Rolling at FT to FT+50° C.: 0.5 to 10 Seconds)

In the present embodiment, a hot-rolled steel sheet being excellent in terms of workability and toughness can be obtained by appropriately controlling the total rolling reduction at FT to FT+50° C. and the time necessary for rolling along with cooling conditions after hot rolling described below.

When the total rolling reduction at FT to FT+50° C. is less than 40%, the structure after transformation becomes coarse, recrystallization between rolling passes and after the finishing of rolling is delayed, the amount of the inside of the steel sheet deformed becomes uneven, and a specific orientation develops after transformation, and thus the stretch flangeability of the steel sheet degrades. Therefore, the total rolling reduction at FT to FT+50° C. is set to 40% or more. On the other hand, when the total rolling reduction in the above-described temperature range exceeds 80%, the texture significantly develops even after recrystallization, and thus the stretch flangeability of the steel sheet degrades. Therefore, the total rolling reduction at FT to FT+50° C. is set to 80% or less.

In the present embodiment, furthermore, it is also important to appropriately control the time necessary for rolling in the above-described temperature range. In a case where the time necessary for rolling in the above-described temperature range is too short, recrystallization does not proceed between passes, rolling strain is excessively stored, and a specific orientation develops, and thus it becomes difficult to obtain a desired texture. Therefore, the time necessary for rolling in the above-described range is set to 0.5 seconds or longer. The time is preferably 1.0 second or longer and more preferably 2.0 seconds or longer. On the other hand, in a case where the time necessary for rolling in the above-described temperature range is too long, recrystallized grains grow between rolling passes, and the structure after transformation becomes coarse. Therefore, the time necessary for rolling in the above-described range is set to 10.0 seconds or shorter. The time is preferably 8.0 seconds or shorter and more preferably 6.0 seconds or shorter.

In both rolling of the rolling at higher than FT+50° C. to FT+150° C. and the rolling at FT to FT+50° C., it is important to repeat working and recrystallization, and thus two or more passes of rolling is carried out in the respective temperature ranges. From the viewpoint of suppressing the development of the texture of the steel sheet, the maximum of the rolling reduction per pass at higher than FT+50° C. to FT+150° C. is preferably 60% or less and more preferably 55% or less. The maximum of the rolling reduction per pass at FT to FT+50° C. is preferably 50% or less, more preferably 45% or less, still more preferably 40% or less, and most preferably 35% or less.

The total rolling reduction refers to the percentage of the total rolling reduction in this temperature range based on the sheet thickness at an inlet before the initial pass in a predetermined temperature range (the difference between the sheet thickness at the inlet before the initial pass of rolling in this predetermined temperature range and the sheet thickness at an outlet after the final pass of the rolling in this predetermined temperature range).

(Finish Temperature FT: Equal to or Higher Than $Ar_3$ obtained from Expression (1), Equal to or Higher than TR Obtained from Expression (2), and 1,100° C. or Lower)

$$Ar_3 \ (°C.)=901-325\times[C]+33\times[Si]-92\times[Mn]+287\times[P]+40\times[Al] \quad (1)$$

$$TR \ (°C.)=800+700\times[Ti]+1000\times[Nb] \quad (2)$$

Here, element symbols in Expressions (1) and (2) indicate the amounts of the respective elements by mass %.

In the present embodiment, the working and recrystallization of austenite during finish rolling is repeated, thereby refining the structures and suppressing the development of the texture. Therefore, the finish temperature FT is set to equal to or higher than $Ar_3$ which is obtained from Expression (1) and equal to or higher than TR which is obtained from Expression (2). Here, the finish temperature FT refers to the surface temperature of the steel sheet after final rolling.

When FT is lower than $Ar_3$, ferritic transformation proceeds during finish rolling, and worked ferrite is generated, and thus the elongation or stretch flangeability of the steel sheet degrades. In addition, when FT is lower than TR, austenite becomes significantly flat after hot rolling and before cooling, and, in the hot-rolled steel sheet as the final product, the structure is stretched in the rolling direction, and the plastic anisotropy increases, and thus the elongation and the stretch flangeability degrades. When FT is set to equal to or higher than TR, the recrystallization of worked austenite is appropriately accelerated between rolling passes, whereby it is possible to refine recrystallized austenite grains, and, after hot rolling, it is possible to obtain a hot-rolled steel sheet having steel structures and a texture preferable for low-temperature toughness and stretch flangeability along with the cooling conditions after hot rolling described below. FT is preferably TR+20° C. or higher and more preferably TR+40° C. or higher.

On the other hand, when FT exceeds 1,100° C., the structure becomes coarse, and the low-temperature toughness of the steel sheet degrades. Therefore, FT is set to 1,100° C. or lower. FT is preferably 1,080° C. or lower and more preferably 1,060° C. or lower. The temperature during finish rolling refers to the surface temperature of steel and can be measured using a radiation-type thermometer or the like.

In the present embodiment, FT is set in a predetermined range, and the time necessary for rolling at FT to FT+50° C. is set in a predetermined range, whereby the recrystallization of austenite between rolling passes in a predetermined temperature range and after finish rolling is accelerated, a ferrite transformation-accelerating effect of worked austenite becomes weak, and it is possible to control the area ratio of ferrite to be 55% or less. Furthermore, it is possible to refine austenite grain sizes, and thus a fine crystal grain size can be obtained, and it is possible to accelerate a decrease in the pole density by the progress of the recrystallization of austenite.

(Time from Completion of Finish Rolling to Initiation of Water Cooling: Within 3.0 seconds)

After the completion of finish rolling, in order to refine the structure using strain stored by rolling, water cooling is initiated within 3.0 seconds. This water cooling may be carried out in a plurality of divided stages. When the time from the completion of finish rolling to the initiation of water cooling is longer than 3.0 seconds, strain in austenite is recovered, and it becomes difficult to obtain a desired structure. The time from the completion of finish rolling to the initiation of water cooling is preferably within 2.0 seconds, more preferably within 1.0 second, and still more preferably within 0.5 seconds. The time from the completion of finish rolling to the initiation of water cooling is preferably 0.05 seconds or longer in order to recrystallize austenite after the completion of finish rolling.

(Average Cooling Rate at FT to 750° C.: 20° C./Second or Faster)

The average cooling rate at the time of cooling the hot-rolled steel sheet after the completion of finish rolling from a temperature at which finish rolling is completed (finish temperature: FT (° C.)) to 750° C. is an important step condition for obtaining a desired structure. In the calculation of the average cooling rate, the time from the completion of finish rolling to the initiation of water cooling is included as the time. When the average cooling rate in the above-described temperature range is slower than 20° C./second, the formation of a fine structure becomes difficult, and ferrite or pearlite is precipitated in the process of cooling, which degrades the stretch flangeability or low-temperature toughness of the steel sheet. Therefore, the average cooling rate in the above-described temperature range is set to 20° C./second or faster. The average cooling rate is preferably 30° C./second or faster and more preferably 40° C./second or faster. The upper limit does not need to be particularly limited, but is preferably 300° C./second or slower from the viewpoint of suppressing the warping of the sheet by thermal strain.

Furthermore, in a temperature range of FT to 750° C., when the hot-rolled steel sheet is rapidly cooled in a high temperature range after the end of finish rolling, it is possible to further refine the structure, and the low-temperature toughness of the steel sheet further improves. In order for that, it is preferable to initiate water cooling within 3.0 seconds after the completion of finish rolling, set the average cooling rate at FT to 750° C. to 20° C./second or faster, and, additionally, set the average cooling rate at FT to FT−40° C. to 100° C./second or faster. In this case, the water cooling does not hinder a step intended for the rapid cooling in the temperature range of FT to FT−40° C. and a plurality of cooling steps for carrying out subsequent cooling. When the average cooling rate at FT to FT−40° C. is slower than 100° C./second, it becomes difficult to obtain the above-described effect. The average cooling rate at FT to FT−40° C. is preferably 120° C./second or faster and more preferably 150° C./second or faster. The upper limit does not need to be particularly limited, but is preferably 1,000° C./second or slower from the viewpoint of suppressing variation in the temperature in the steel sheet.

The rapid cooling in a high temperature range after the end of finish rolling (cooling at FT to FT−40° C.) is not limited to after the final stand of finish rolling and may be carried out between rolling stands. That is, rolling may not be carried out in a stand after the rapid cooling or rolling with a rolling reduction of 8% or less may be added for the purpose of the correction of the shape, the control of cooling, or the like. In this case, rolling after rapid cooling is not included in a finish rolling step.

(Dwell Time at 750° C. to 600° C.: 5 to 20 Seconds)

When the hot-rolled steel sheet after finish rolling reaches a temperature range of 750° C. to 600° C., transformation of austenite into ferrite becomes active. Therefore, the hot-rolled steel sheet is dwelled in the above-described temperature range for 5 seconds or longer to accelerate transformation of austenite into ferrite, thereby obtaining a desired area ratio of ferrite. When the dwell time in the above-described temperature range is shorter than 5 seconds, transformation of austenite to ferrite does not sufficiently proceed, and it becomes difficult to obtain a desired area ratio of ferrite. Therefore, the dwell time in the above-described temperature range is set to 5 seconds or longer. The dwell time is preferably seven seconds or longer. On the other hand, when the dwell time in the above-described temperature range exceeds 20 seconds, ferrite is excessively precipitated or pearlite or cementite is precipitated. Therefore, the dwell time is preferably 20 seconds or shorter. The dwell time is preferably 17 seconds or shorter and more preferably 14 seconds or shorter.

In the present embodiment, the dwell time at 750° C. to 600° C. refers to a time taken for the temperature of the hot-rolled steel sheet after finish rolling to decrease 750° C. to 600° C., and it is not always necessary for the steel sheet to be cooled in this time range.

(Average Cooling Rate from 600° C. to Cooling Stop Temperature of Lower than Ms: 20° C./Second or faster)

$$Ms\ (°\ C.)=561-474\times[C]-33\times[Mn]-17\times[Ni]-21\times[Mo] \quad (3)$$

In order to transform non-transformed austenite remaining in the hot-rolled steel sheet after being dwelled in the temperature range of 750° C. to 600° C. for 5 to 20 seconds into martensite and bainite and obtain a tensile strength of 950 MPa or more, the average cooling rate from 600° C. to a cooling stop temperature that is lower than a martensite transformation start temperature Ms represented by Expression (3) is set to 20° C./second or faster. When the average cooling rate in the above-described temperature range is slower than 20° C./second, it becomes difficult to obtain a desired structure due to the excessive formation of pearlite during cooling or the like, and consequently, it becomes difficult to obtain a tensile strength of 950 MPa or more. The average cooling rate in the above-described temperature range is preferably 40° C./second or faster and more preferably 50° C./second or faster. The upper limit of the average cooling rate in the above-described temperature range is not particularly limited, but is preferably 300° C./second or slower from the viewpoint of suppressing the warping of the sheet by thermal strain.

(Average Cooling Rate From Ms to Cooling Stop Temperature of Lower Than Ms: 80° C./second or faster)

In order to further increase the tensile strength of the steel sheet, the average cooling rate from Ms to the cooling stop temperature of lower than Ms is preferably set to 80° C./second or faster. The average cooling rate is more preferably 100° C./second or faster and still more preferably 120° C./second or faster. The upper limit does not need to be particularly limited, but is preferably 500° C./second or slower from the viewpoint of the uniformity of the structure in the sheet thickness direction. The upper limit is more preferably 400° C./second or slower. In addition, the cooling stop temperature of lower than Ms is preferably Ms −20° C. or lower and more preferably Ms −50° C. or lower.

After cooled to the cooling stop temperature of lower than Ms, generally, coiling is carried out.

At the time of manufacturing the hot-rolled steel sheet according to the present embodiment, for example, known temper rolling for the purpose of shape correction may be appropriately carried out. In addition, the steel sheet may be made a plated steel sheet by carrying out plating. The plating may be any of electro coating and hot dip coating, and the kind of plating is also not particularly limited; however, generally, zinc-based plating including galvanizing and zinc alloy coating is used. As examples of a plated steel sheet, an electro coated steel sheet, an electrolytic zinc-nickel alloy-coated steel sheet, a hot-dip galvanized steel sheet, a hot-dip galvannealed steel sheet, a hot-dip zinc-aluminum alloy-coated steel sheet, and the like are exemplified. The plated amount may be an ordinary amount.

The sheet thickness of the hot-rolled steel sheet according to the present embodiment is not particularly limited; however, in a case where the sheet thickness is too thick, structures generated in the surface layer and the inside of the steel sheet significantly differ, and thus the sheet thickness is preferably 6.0 mm or less. On the other hand, when the sheet thickness is too thin, threading during hot rolling becomes difficult, and thus the sheet thickness is, generally, preferably 1.0 mm or more. The sheet thickness is more preferably 1.2 mm or more and still more preferably 1.5 mm or more.

EXAMPLES

Steel having a chemical composition (mass %) shown in Table 1 was melted and cast, and a 30 mm-thick steel piece was produced by hot forging. The obtained steel piece was heated, two to four passes of rolling were carried out a plurality of times in both rolling of rolling at higher than FT+50° C. to FT+150° C. and rolling at FT to FT+50° C. in a small-sized tandem mill for testing, and hot rolling was carried out under conditions shown in Table 2-1 and Table 2-2, thereby preparing a hot-rolled steel sheet having a sheet thickness of 2.5 to 3.5 mm. Manufacturing conditions are shown in Table 2-1 and Table 2-2. Underlined letters indicate that the values are outside the scope of the present invention.

TABLE 1

| Steel | Chemical composition (mass %)/remainder: Fe and impurity | | | | | | | | | Ar₃ (° C.) | Ms (° C.) | TR (° C.) |
|---|---|---|---|---|---|---|---|---|---|---|---|---|
| | C | Si | Mn | P | S | sol. Al | N | Ti | Others | | | |
| A | 0.06 | 0.99 | 1.96 | 0.013 | 0.0035 | 0.34 | 0.0025 | 0.117 | Nb: 0.010 | 751 | 468 | 892 |
| B | 0.14 | 1.20 | 1.65 | 0.014 | 0.0042 | 0.34 | 0.0032 | 0.105 | | 761 | 440 | 874 |
| C | 0.17 | 1.31 | 2.04 | 0.015 | 0.0045 | 0.21 | 0.0032 | 0.051 | | 714 | 413 | 836 |
| D | 0.16 | 1.32 | 1.82 | 0.016 | 0.0041 | 0.12 | 0.0036 | 0.053 | | 735 | 425 | 837 |
| E | 0.10 | 1.23 | 3.12 | 0.009 | 0.0041 | 0.32 | 0.0028 | 0.105 | | 637 | 411 | 874 |
| F | 0.10 | 0.49 | 2.05 | 0.016 | 0.0043 | 0.65 | 0.0029 | 0.108 | | 727 | 446 | 876 |
| G | 0.06 | 1.05 | 1.78 | 0.014 | 0.0045 | 0.37 | 0.0032 | 0.105 | | 771 | 474 | 874 |
| H | 0.06 | 0.99 | 1.00 | 0.011 | 0.0043 | 0.32 | 0.0040 | 0.092 | | 838 | 500 | 864 |
| I | 0.23 | 1.02 | 2.05 | 0.013 | 0.0039 | 0.36 | 0.0036 | 0.052 | | 689 | 384 | 836 |
| J | 0.06 | 1.29 | 1.80 | 0.018 | 0.0046 | 0.04 | 0.0044 | 0.124 | | 766 | 473 | 887 |
| K | 0.06 | 1.04 | 1.76 | 0.015 | 0.0012 | 0.36 | 0.0021 | 0.123 | Nb: 0.005 | 772 | 474 | 891 |
| L | 0.06 | 1.03 | 1.76 | 0.019 | 0.0040 | 0.34 | 0.0032 | 0.122 | V: 0.05 | 773 | 475 | 885 |
| M | 0.06 | 1.03 | 1.75 | 0.014 | 0.0036 | 0.33 | 0.0032 | 0.122 | Mo: 0.11, Cr: 0.32 | 771 | 472 | 885 |
| N | 0.06 | 1.02 | 1.66 | 0.016 | 0.0043 | 0.36 | 0.0036 | 0.123 | Cu: 0.12, Ni: 0.25 | 781 | 474 | 886 |
| O | 0.06 | 1.00 | 1.65 | 0.017 | 0.0038 | 0.35 | 0.0040 | 0.125 | B: 0.0011 | 782 | 478 | 888 |
| P | 0.06 | 1.05 | 1.65 | 0.013 | 0.0034 | 0.32 | 0.0035 | 0.126 | Ca: 0.0015 | 781 | 478 | 888 |
| Q | 0.06 | 1.03 | 1.69 | 0.018 | 0.0048 | 0.36 | 0.0032 | 0.128 | Mg: 0.0021 | 779 | 477 | 890 |
| R | 0.06 | 1.04 | 1.72 | 0.015 | 0.0043 | 0.34 | 0.0036 | 0.224 | | 776 | 476 | 957 |
| S | 0.06 | 1.05 | 1.79 | 0.014 | 0.0035 | 0.36 | 0.0032 | 0.123 | Nb: 0.058 | 770 | 474 | 944 |
| T | 0.07 | 1.02 | 1.75 | 0.016 | 0.0035 | 0.35 | 0.0033 | 0.128 | REM: 0.0016 | 770 | 471 | 890 |
| U | 0.07 | 0.98 | 1.99 | 0.015 | 0.0042 | 0.35 | 0.0031 | 0.125 | | 746 | 462 | 888 |
| V | 0.07 | 0.95 | 1.80 | 0.020 | 0.0025 | 0.38 | 0.0026 | 0.121 | | 765 | 468 | 885 |
| W | 0.07 | 1.29 | 1.70 | 0.012 | 0.0035 | 0.05 | 0.0029 | 0.105 | | 770 | 472 | 874 |

Underlines indicate that values are outside the scope of the present invention.

TABLE 2-1

| Specimen No. | Steel | Heating temperature (° C.) | Total rolling reduction at FT + 50° C. to FT + 150° C. (%) | Total rolling reduction at FT to FT + 50° C. (%) | Rolling time from FT to FT + 50° C. (s) | Finish temperature FT (° C.) | Time from completion of finish rolling to initiation of water cooling (s) | Average cooling rate from FT to FT − 40° C. (° C./s) |
|---|---|---|---|---|---|---|---|---|
| 1 | A | 1250 | 61 | 43 | 2.0 | 938 | 0.6 | 85 |
| 2 | A | 1250 | 67 | 59 | 2.1 | 956 | 0.6 | 69 |
| 3 | A | 1250 | 78 | 83 | 3.2 | 898 | 1.4 | 105 |
| 4 | A | 1250 | 77 | 34 | 2.0 | 912 | 0.5 | 76 |
| 5 | A | 1250 | 27 | 58 | 1.9 | 921 | 0.5 | 76 |
| 6 | A | 1250 | 67 | 65 | 2.3 | 925 | 0.5 | 76 |
| 7 | A | 1250 | 61 | 70 | 2.0 | 940 | 0.3 | 61 |
| 8 | A | 1250 | 61 | 73 | 2.1 | 945 | 0.3 | 57 |
| 9 | A | 1250 | 61 | 73 | 2.1 | 952 | 0.1 | 178 |
| 10 | A | 1250 | 63 | 70 | 2.1 | 985 | 1.1 | 69 |
| 11 | A | 1250 | 61 | 78 | 3.2 | 912 | 0.2 | 85 |
| 12 | A | 1250 | 51 | 78 | 3.2 | 925 | 1.5 | 70 |
| 13 | A | 1250 | 65 | 72 | 0.3 | 945 | 0.5 | 62 |
| 14 | A | 1250 | 64 | 72 | 11.1 | 946 | 0.6 | 58 |
| 15 | B | 1250 | 67 | 67 | 2.0 | 932 | 0.4 | 71 |
| 16 | B | 1250 | 80 | 66 | 2.0 | 842 | 0.4 | 54 |
| 17 | C | 1250 | 67 | 68 | 3.0 | 927 | 0.4 | 71 |
| 18 | D | 1250 | 67 | 61 | 1.9 | 942 | 0.5 | 85 |
| 19 | E | 1250 | 82 | 66 | 2.1 | 942 | 0.6 | 65 |
| 20 | F | 1250 | 67 | 69 | 3.4 | 943 | 0.5 | 73 |

| Specimen No. | Average cooling rate from FT to 750° C. (° C./s) | Dwell time at 600° C. to 750° C. (s) | Average cooling rate from 600° C. to cooling stop temperature (° C./s) | Average cooling rate from 600° C. to Ms (° C./s) | Average cooling rate from Ms to cooling stop temperature (° C./s) | Cooling stop temperature (° C.) |
|---|---|---|---|---|---|---|
| 1 | 56 | 7 | 102 | 62 | 129 | 51 |
| 2 | 45 | 7 | 103 | 65 | 125 | 24 |
| 3 | 41 | 5 | 105 | 70 | 123 | 40 |
| 4 | 52 | 7 | 112 | 85 | 124 | 42 |
| 5 | 52 | 7 | 107 | 75 | 124 | 42 |
| 6 | 52 | 24 | 93 | 69 | 105 | 61 |
| 7 | 45 | 6 | 70 | 59 | 75 | 42 |
| 8 | 42 | 6 | 106 | 68 | 129 | 42 |
| 9 | 42 | 6 | 107 | 68 | 131 | 49 |
| 10 | 42 | 11 | 103 | 65 | 125 | 24 |

TABLE 2-1-continued

| | | | | | | |
|---|---|---|---|---|---|---|
| 11 | 56 | 6 | 102 | 62 | 129 | 51 |
| 12 | 65 | 8 | 106 | 85 | 115 | 42 |
| 13 | 48 | 6 | 108 | 65 | 135 | 38 |
| 14 | 46 | 6 | 103 | 60 | 132 | 42 |
| 15 | 50 | 7 | 93 | 75 | 102 | 21 |
| 16 | 38 | <u>4</u> | 98 | 85 | 105 | 42 |
| 17 | 49 | 8 | 94 | 72 | 110 | 31 |
| 18 | 57 | 7 | 97 | 84 | 105 | 64 |
| 19 | 55 | 18 | 85 | 62 | 105 | 41 |
| 20 | 50 | 7 | 92 | 75 | 102 | 69 |

Underlines indicate that values are outside the scope of the present invention.

TABLE 2-2

| Specimen No. | Steel | Heating temperature (° C.) | Total rolling reduction at FT + 50° C. to FT + 150° C. (%) | Total rolling reduction at FT to FT + 50° C. (%) | Rolling time from FT to FT + 50° C. (s) | Finish temperature FT (C.) | Time from completion of finish rolling to initiation of water cooling (s) | Average cooling rate from FT to FT − 40° C. (T/s) |
|---|---|---|---|---|---|---|---|---|
| 21 | G | 1250 | 81 | 68 | 2.1 | 948 | 0.5 | 77 |
| 22 | <u>H</u> | 1250 | 67 | 63 | 2.1 | 941 | 0.6 | 77 |
| 23 | <u>I</u> | 1250 | 67 | 64 | 2.2 | 935 | 0.5 | 75 |
| 24 | J | 1250 | 79 | 66 | 2.0 | 945 | 0.6 | 84 |
| 25 | J | 1250 | 80 | 64 | 2.1 | 952 | 0.1 | 186 |
| 26 | K | 1250 | 67 | 67 | 2.1 | 962 | 0.1 | 195 |
| 27 | K | 1251 | 67 | 68 | 2.0 | 932 | 0.1 | 201 |
| 28 | L | 1250 | 81 | 66 | 2.0 | 941 | 0.1 | 187 |
| 29 | M | 1250 | 67 | 65 | 1.9 | 935 | 0.1 | 189 |
| 30 | N | 1250 | 67 | 68 | 3.1 | 928 | 0.1 | 178 |
| 31 | O | 1250 | 79 | 65 | 2.1 | 953 | 0.1 | 178 |
| 32 | P | 1250 | 67 | 65 | 1.9 | 947 | 0.1 | 195 |
| 33 | P | 1250 | 77 | 55 | 2.2 | 953 | 0.1 | 168 |
| 34 | Q | 1250 | 77 | 67 | 2.0 | 941 | 0.1 | 179 |
| 35 | Q | 1250 | 78 | 56 | 2.0 | 957 | 0.1 | 185 |
| 36 | <u>R</u> | 1250 | 67 | 65 | 2.0 | 995 | 0.1 | 187 |
| 37 | S | 1250 | 67 | 66 | 2.0 | 952 | 0.1 | 179 |
| 38 | T | 1250 | 69 | 67 | 2.0 | 932 | 0.1 | 165 |
| 39 | U | 1250 | 69 | 67 | 2.0 | 925 | 0.1 | 174 |
| 40 | V | 1250 | 74 | 69 | 3.3 | 959 | 0.1 | 156 |
| 41 | W | 1250 | 73 | 67 | 2.0 | 925 | 0.1 | 152 |

| Specimen No. | Average cooling rate from FT to 750° C. (° C./s) | Dwell time at 600° C. to 750° C. (s) | Average cooling rate from 600° C. to cooling stop temperature (° C./s) | Average cooling rate from 600° C. to Ms (° C./s) | Average cooling rate from Ms to cooling stop temperature (° C./s) | Cooling stop temperature (° C.) |
|---|---|---|---|---|---|---|
| 21 | 53 | 7 | 97 | 73 | 108 | 52 |
| 22 | 49 | 7 | 104 | 81 | 111 | 70 |
| 23 | 51 | 18 | 89 | 67 | 115 | 63 |
| 24 | 54 | 7 | 113 | 91 | 122 | 41 |
| 25 | 54 | 8 | 113 | 91 | 122 | 52 |
| 26 | 57 | 7 | 109 | 69 | 131 | 55 |
| 27 | <u>10</u> | 6 | 105 | 68 | 125 | 31 |
| 28 | 50 | 7 | 104 | 74 | 119 | 55 |
| 29 | 51 | 14 | 102 | 68 | 118 | 28 |
| 30 | 56 | 7 | 103 | 71 | 119 | 64 |
| 31 | 61 | 15 | 108 | 69 | 128 | 19 |
| 32 | 61 | 7 | 102 | 64 | 122 | 34 |
| 33 | 62 | 7 | 105 | 66 | 125 | 40 |
| 34 | 52 | 7 | 100 | 75 | 111 | 56 |
| 35 | 64 | 7 | 110 | 70 | 132 | 42 |
| 36 | 48 | 7 | 110 | 78 | 124 | 38 |
| 37 | 47 | 7 | 102 | 74 | 115 | 61 |
| 38 | 45 | 7 | 119 | 68 | 156 | 61 |
| 39 | 46 | 7 | 140 | 82 | 184 | 61 |
| 40 | 48 | 7 | 120 | 89 | 135 | 61 |
| 41 | 82 | 6 | 109 | 56 | 152 | 35 |

Underlines indicate that values are outside the scope of the present invention.

For the obtained hot-rolled steel sheets, a cross section of the steel sheet parallel to a rolling direction and a sheet thickness direction was observed by scanning electron microscope observation and EBSD analysis, and the area ratios of structures and the average crystal grain size at a location of a depth of ¼ of the sheet thickness from the surface of the steel sheet and the pole densities of individual crystal orientations in a sheet thickness central portion were obtained.

For a specimen used for the EBSD analysis, after mirror polishing, work strain in the surface layer of the observation surface was removed by electrolytic polishing. In the EBSD analysis, in a region having the location at a depth of ¼ of the sheet thickness from the surface of the steel sheet at the center and a size of 200 μm in the rolling direction and 100 μm in the sheet thickness direction, crystal orientation information was measured at intervals of 0.2 μm separately for fcc and bcc using an EBSD analysis instrument configured of a thermal field-emission-type scanning electron microscope and an EBSD detector, regions having a crystal orientation difference of 15° or more and a circle-equivalent diameter of 0.3 μm or more were defined as crystal grains using accessory software of the EBSD analysis instrument ("OIM Analysis (registered trademark)" manufactured by AMETEK. Inc.), and the average crystal grain size of bcc and the area ratio of fcc (residual austenite) were obtained. Regarding the average crystal grain size of bcc, a value calculated using an expression shown in [Expression 1] was obtained. In the expression, N represents the number of crystal grains included in the evaluation region of the average crystal grain size, Ai represents an area of the $i^{th}$ (i=1, 2, . . . , N) crystal grain, and di represents the circle-equivalent diameter of the $i^{th}$ crystal grain.

$$D = \frac{\sum_{i=1}^{N} Ai \times di}{\sum_{i=1}^{N} Ai}$$

The area ratios of ferrite, "bainite, martensite, (and residual austenite)" and residual structures (pearlite and grain boundary cementite) were obtained by SEM observation. Here, the residual austenite was present between the laths or blocks of bainite and martensite, and it was difficult to differentiate bainite and martensite, and residual austenite, and was thus included in "bainite, martensite, (and residual austenite)". The area ratios of bainite and martensite were obtained by subtracting the area ratio of fcc (residual austenite) obtained by the EBSD analysis from the area ratios of ferrite, "bainite, martensite, (and residual austenite)" obtained by SEM observation.

The pole densities of the respective crystal orientations in the sheet thickness central portion were obtained by ODF analysis using harmonic series expansion after measuring information of the crystal grain orientations of 4,500 to 5,500 bcc crystal grain orientations, separately for fcc and bcc, in the sheet thickness central portion (the range of approximately ¹⁄₁₀ of the sheet thickness in the front direction and the rear direction of the steel sheet respectively from the sheet thickness central location (the location of a depth of ½ of the sheet thickness from the surface of the steel sheet)) by EBSD analysis using the same instrument.

In order to evaluate the mechanical characteristics of the hot-rolled steel sheet, the tensile strength TS (MPa) and the percentage total extension at fracture (El) (%) were based on JIS Z 2241:2011, the r value was based on JIS Z 2254:2008 as |Δr|, and the stretch flangeability was evaluated using the limiting hole expansion ratio (λ) (%) measured on the basis of JIS Z 2256:2010. The low-temperature toughness was evaluated using the fracture appearance transition temperature vTrs (° C.) and evaluated by carrying out a Charpy impact test using a V-notch test piece obtained by working the steel sheet to a 2.5 mm sub-size test piece on the basis of JIS Z 2242:2005.

Steel structures, textures, and the investigation results of the mechanical characteristics are shown in Table 3-1 and Table 3-2. The maximum pole density of orientation groups of {100} <011>, {211} <011>, {311} <011>, {110} <011>, and {332} <113> are shown in the column "Maximum pole density of orientation groups" in Table 3-1 and Table 3-2.

The tensile strength was evaluated as pass by regarding a tensile strength of 950 MPa or more as a high strength, |Δr| was evaluated as pass by considering that the stretch flangeability was excellent in a case where |Δr| is 0.40 or less, and vTrs (° C.) was evaluated as pass by considering that the low-temperature toughness was excellent in a case where vTrs is −40° C. or lower. The workability was evaluated not only by the indexes of the percentage total extension at fracture and |Δr| but also by the balance between the strength and the percentage total extension at fracture (TS×El) and the balance between the strength and the stretch flangeability (TS×λ). TS×El (MPa·%) was evaluated as pass by considering the strength was high and the elongation was excellent in a case where TS×El was 14,000 MPa·% or more, and TS×λ(MPa·%) was evaluated as pass by considering the strength was high and the stretch flangeability was excellent in a case where TS×λ was 50,000 MPa·% or more.

TABLE 3-1

| Specimen No. | Steel | Area ratio of ferrite (%) | Area ratio of bainite and martensite (%) | Area ratio of ferrite, bainite, and martensite (%) | Area ratios of other structures (P, θ) (%) | Area ratios of other structures (residual γ) (%) | Average crystal grain size (μm) | Maximum pole density of main orientation group |
|---|---|---|---|---|---|---|---|---|
| 1 | A | 25 | 74 | 99 | 0 | 1 | 6.7 | 4.8 |
| 2 | A | 34 | 66 | 100 | 0 | 0 | 6.4 | 4.2 |
| 3 | A | 52 | 48 | 100 | 0 | 0 | 8.2 | 8.4 |
| 4 | A | 42 | 56 | 98 | 2 | 0 | 5.8 | 6.5 |
| 5 | A | 64 | 34 | 98 | 2 | 0 | 15.6 | 8.2 |
| 6 | A | 90 | 5 | 95 | 4 | 1 | 5.7 | 4.1 |
| 7 | A | 25 | 74 | 99 | 1 | 0 | 6.1 | 4.1 |
| 8 | A | 27 | 72 | 99 | 1 | 0 | 6.1 | 4.3 |
| 9 | A | 33 | 66 | 99 | 1 | 0 | 5.4 | 4.3 |
| 10 | A | 32 | 65 | 97 | 3 | 0 | 8.6 | 4.2 |

TABLE 3-1-continued

| | | | | | | | | |
|---|---|---|---|---|---|---|---|---|
| 11 | A | 25 | 73 | 98 | 2 | 0 | 5.4 | 5.9 |
| 12 | A | 32 | 66 | 98 | 2 | 0 | 8.0 | 7.5 |
| 13 | A | 62 | 34 | 96 | 3 | 1 | 5.4 | 8.6 |
| 14 | A | 12 | 85 | 97 | 2 | 1 | 13.2 | 3.8 |
| 15 | B | 42 | 56 | 98 | 1 | 1 | 5.8 | 4.3 |
| 16 | B | 53 | 46 | 99 | 1 | 0 | 4.2 | 9.5 |
| 17 | C | 25 | 73 | 98 | 2 | 0 | 6.7 | 4.3 |
| 18 | D | 29 | 69 | 98 | 2 | 0 | 7.1 | 3.6 |
| 19 | E | 8 | 85 | 93 | 6 | 1 | 6.0 | 5.2 |
| 20 | F | 25 | 73 | 98 | 2 | 0 | 6.1 | 4.4 |

| Specimen No. | Total of pole densities of {211}<011> and {332}<113> | TS (MPa) | \|Δr\| | El (%) | TS × El (MPa · %) | λ (%) | TS × λ (MPa · %) | vTrs (° C.) | Abstract |
|---|---|---|---|---|---|---|---|---|---|
| 1 | 3.4 | 1070 | 0.19 | 14.3 | 15250 | 68 | 72263 | −71 | Invention Example |
| 2 | 4.7 | 1045 | 0.15 | 16.0 | 16728 | 73 | 76622 | −72 | Invention Example |
| 3 | 6.2 | 821 | 0.34 | 17.2 | 14121 | 50 | 41050 | −61 | Comparative Example |
| 4 | 12.1 | 1024 | 0.32 | 17.2 | 17607 | 42 | 42993 | −48 | Comparative Example |
| 5 | 11.8 | 964 | 0.46 | 18.5 | 17826 | 24 | 22946 | −5 | Comparative Example |
| 6 | 5.6 | 785 | 0.21 | 18.5 | 14523 | 80 | 62551 | −69 | Comparative Example |
| 7 | 6.5 | 986 | 0.18 | 15.4 | 15184 | 72 | 70992 | −62 | Invention Example |
| 8 | 6.5 | 1065 | 0.17 | 16.1 | 17140 | 68 | 72882 | −66 | Invention Example |
| 9 | 6.5 | 1048 | 0.16 | 16.5 | 17295 | 71 | 74471 | −74 | Invention Example |
| 10 | 4.0 | 1051 | 0.09 | 14.8 | 15600 | 82 | 85846 | −58 | Invention Example |
| 11 | 8.6 | 1070 | 0.24 | 14.3 | 15250 | 57 | 61197 | −71 | Invention Example |
| 12 | 3.8 | 1051 | 0.38 | 14.8 | 15600 | 52 | 54648 | −62 | Invention Example |
| 13 | 7.1 | 902 | 0.35 | 16.2 | 14612 | 40 | 36080 | −22 | Comparative Example |
| 14 | 3.7 | 1065 | 0.13 | 14.1 | 15017 | 55 | 58575 | −10 | Comparative Example |
| 15 | 6.4 | 1089 | 0.22 | 14.8 | 16100 | 59 | 64541 | −56 | Invention Example |
| 16 | 13.4 | 1006 | 0.43 | 15.6 | 15694 | 26 | 26181 | 6 | Comparative Example |
| 17 | 5.8 | 1115 | 0.32 | 13.3 | 15250 | 52 | 59097 | −45 | Invention Example |
| 18 | 5.0 | 1156 | 0.23 | 13.4 | 15464 | 56 | 64460 | −52 | Invention Example |
| 19 | 4.1 | 1123 | 0.22 | 11.0 | 12353 | 40 | 44920 | −20 | Comparative Example |
| 20 | 5.0 | 1175 | 0.20 | 13.0 | 15250 | 60 | 70198 | −61 | Invention Example |

Underlines indicate that values are outside the scope of the present invention.

TABLE 3-2

| Specimen No. | Steel | Area ratio of ferrite (%) | Area ratio of bainite and martensite (%) | Area ratio of ferrite, bainite, and martensite (%) | Area ratios of other structures (P, θ) (%) | Area ratios of other structures (residual γ) (%) | Average crystal grain size (μm) | Maximum pole density of main orientation group |
|---|---|---|---|---|---|---|---|---|
| 21 | G | 25 | 73 | 98 | 2 | 0 | 5.6 | 4.5 |
| 22 | H | 85 | 2 | 87 | 13 | 0 | 6.4 | 3.9 |
| 23 | I | 48 | 44 | 92 | 8 | 0 | 6.9 | 3.9 |
| 24 | J | 51 | 47 | 98 | 1 | 1 | 5.6 | 7.9 |
| 25 | J | 49 | 49 | 98 | 2 | 0 | 4.5 | 7.7 |
| 26 | K | 40 | 58 | 98 | 2 | 0 | 5.2 | 4.3 |
| 27 | K | 75 | 11 | 86 | 12 | 2 | 4.6 | 4.3 |
| 28 | L | 39 | 59 | 98 | 2 | 0 | 4.2 | 4.2 |
| 29 | M | 24 | 74 | 98 | 2 | 0 | 4.7 | 4.9 |

TABLE 3-2-continued

| | | | | | | | | |
|---|---|---|---|---|---|---|---|---|
| 30 | N | 35 | 61 | 96 | 3 | 1 | 4.5 | 5.2 |
| 31 | O | 30 | 68 | 98 | 2 | 0 | 4.5 | 5.2 |
| 32 | P | 45 | 53 | 98 | 2 | 0 | 4.9 | 4.0 |
| 33 | P | 32 | 68 | 100 | 0 | 0 | 5.6 | 3.6 |
| 34 | Q | 42 | 55 | 97 | 3 | 0 | 4.3 | 7.2 |
| 35 | Q | 30 | 69 | 99 | 1 | 0 | 5.8 | 4.5 |
| 36 | R | 42 | 56 | 98 | 2 | 0 | 5.6 | 4.1 |
| 37 | S | 36 | 61 | 97 | 2 | 1 | 5.0 | 4.1 |
| 38 | T | 30 | 68 | 98 | 2 | 0 | 4.5 | 4.5 |
| 39 | U | 34 | 65 | 99 | 1 | 0 | 4.4 | 4.5 |
| 40 | V | 25 | 73 | 98 | 1 | 1 | 4.8 | 6.0 |
| 41 | W | 15 | 83 | 98 | 2 | 0 | 4.4 | 5.3 |

| Specimen No. | Total of pole densities of {211}<011> and {332}<113> | TS (MPa) | $|\Delta r|$ | El (%) | TS × El (MPa·%) | λ (%) | TS × λ (MPa·%) | vTrs (°C.) | Abstract |
|---|---|---|---|---|---|---|---|---|---|
| 21 | 4.8 | 995 | 0.19 | 15.3 | 15250 | 73 | 72284 | −68 | Invention Example |
| 22 | 5.1 | 685 | 0.21 | 20.0 | 13700 | 51 | 34935 | −5 | Comparative Example |
| 23 | 5.4 | 1240 | 0.25 | 11.2 | 13888 | 28 | 34720 | 15 | Comparative Example |
| 24 | 4.9 | 1017 | 0.18 | 16.3 | 16547 | 68 | 68949 | −70 | Invention Example |
| 25 | 4.5 | 1022 | 0.17 | 16.1 | 16450 | 70 | 71169 | −81 | Invention Example |
| 26 | 4.0 | 1033 | 0.14 | 15.5 | 15982 | 76 | 78078 | −87 | Invention Example |
| 27 | 5.5 | 784 | 0.20 | 17.5 | 13720 | 53 | 41552 | −12 | Comparative Example |
| 28 | 5.1 | 1031 | 0.19 | 15.4 | 15930 | 78 | 80022 | −82 | Invention Example |
| 29 | 5.4 | 1073 | 0.20 | 14.1 | 15178 | 75 | 80424 | −82 | Invention Example |
| 30 | 5.7 | 1038 | 0.22 | 15.2 | 15750 | 75 | 77417 | −82 | Invention Example |
| 31 | 4.5 | 1052 | 0.16 | 14.7 | 15500 | 81 | 85096 | −83 | Invention Example |
| 32 | 4.8 | 1015 | 0.17 | 16.0 | 16235 | 80 | 81416 | −85 | Invention Example |
| 33 | 4.2 | 1052 | 0.16 | 15.2 | 15990 | 78 | 82056 | −70 | Invention Example |
| 34 | 5.1 | 1022 | 0.19 | 15.7 | 16097 | 80 | 81762 | −80 | Invention Example |
| 35 | 4.3 | 1065 | 0.19 | 15.2 | 16188 | 79 | 84135 | −65 | Invention Example |
| 36 | 2.4 | 1063 | 0.16 | 14.2 | 15098 | 34 | 36151 | −6 | Comparative Example |
| 37 | 4.5 | 985 | 0.11 | 16.0 | 15800 | 93 | 91917 | −83 | Invention Example |
| 38 | 5.5 | 1089 | 0.20 | 14.2 | 15500 | 73 | 79542 | −83 | Invention Example |
| 39 | 5.9 | 1102 | 0.22 | 14.2 | 15700 | 70 | 76983 | −79 | Invention Example |
| 40 | 6.0 | 1061 | 0.15 | 14.0 | 14854 | 61 | 64721 | −84 | Invention Example |
| 41 | 5.9 | 1127 | 0.23 | 14.2 | 16002 | 69 | 77393 | −82 | Invention Example |

Underlines indicate that values are outside the scope of the present invention.

As is clear from Table 3-1 and Table 3-2, it is found that the invention examples according to the present invention had a tensile strength of 950 MPa or more, $|\Delta l|$ of 0.40 or less, and vTrs of −40° C. and were thus excellent in terms of strength, stretch flangeability, and low-temperature toughness. Furthermore, it is found that the invention examples had TS×El of 14,000 MPa·% or more and TS×λ of 50,000 MPa·% or more and had all of a high strength, elongation, and stretch flangeability. According to the present invention, it is possible to obtain a hot-rolled steel sheet being excellent in terms of strength, elongation, stretch flangeability, and low-temperature toughness.

In contrast, comparative examples having a chemical composition, steel structures other than a texture, or the texture outside the scope of the present invention were poor in terms of any of strength, elongation, stretch flangeability, and low-temperature toughness.

The invention claimed is:
1. A hot-rolled steel sheet having a chemical composition containing, by mass %:
C: 0.02% to 0.20%,
Si: 0.005% to 2.00%,
Mn: 1.30% to 2.40%,
P: 0.100% or less,
S: 0.0100% or less, sol. Al: 0.001% to 1.00%,
Ti: 0.030% to 0.200%,
N: 0.0010% to 0.0100%,
Nb: 0% to 0.100%,
V: 0% to 0.50%,
Mo: 0% to 0.50%,
Cu: 0% to 1.00%,
Ni: 0% to 1.00%,
Cr: 0% to 2.00%,
B: 0% to 0.0100%,
Ca: 0% to 0.0100%,
Mg: 0% to 0.0100%, and
REM: 0% to 0.0100%
with a remainder being Fe and an impurity,
wherein, in a location at a depth of ¼ of a sheet thickness from a surface, an area ratio of ferrite is 10% to 55%, a total area ratio of bainite and martensite is 45% to 90%, a total area ratio of the ferrite, the bainite and the martensite is 90% or more, an area ratio of residual austenite is 1.0% or less, and an average crystal grain size is 12.0 µm or less,
in a texture measured in a sheet thickness central portion, a maximum pole density of orientation groups of {100} <011>, {211} <011>, {311} <011>, {110} <011> and {332} <113> is 8.0 or less, a total of pole densities of {211} <011> and {332} <113> is 10.0 or less, and
a tensile strength is 950 MPa or more.

2. The hot-rolled steel sheet according to claim 1,
wherein the chemical composition contains, by mass %, one or more selected from the group consisting of
Nb: 0.001% to 0.100%,
V: 0.005% to 0.50%,
Mo: 0.001% to 0.50%,
Cu: 0.02% to 1.00%,
Ni: 0.02% to 1.00%,
Cr: 0.02% to 2.00%, and
B: 0.0001% to 0.0100%.

3. The hot-rolled steel sheet according to claim 1,
wherein the chemical composition contains, by mass %, one or more selected from the group consisting of
Ca: 0.0002% to 0.0100%,
Mg: 0.0002% to 0.0100%, and
REM: 0.0002% to 0.0100%.

4. The hot-rolled steel sheet according to claim 1,
wherein an absolute value $|\Delta r|$ of an in-plane anisotropy of an r value is 0.35 or less,
here, $\Delta r = (r_0 + r_{90} - 2 \times r_{45})/2$
$r_0$ represents the r value in a rolling direction, $r_{90}$ represents the r value in a rolling orthogonal direction, and $r_{45}$ represents the r value in a 45° direction with respect to the rolling direction.

5. A method for manufacturing a hot-rolled steel sheet in which, in manufacturing of the hot-rolled steel sheet according to any one of claims 1 to 4, multi-pass hot rolling is carried out on a slab or a steel piece having the chemical composition of said hot-rolled steel sheet, thereby manufacturing the hot-rolled steel sheet,
wherein a heating temperature in the multi-pass hot rolling is set to 1,150° C. to 1,350° C.,
when a finish temperature is represented by FT in a unit of ° C., a total rolling reduction at higher than the FT+50° C. to the FT+150° C. is set to 50% or more, a total rolling reduction at the FT to the FT+50° C. is set to 40% to 80%, a time necessary for rolling at the FT to the FT+50° C. is set to 0.5 to 10.0 seconds,
in individual temperature ranges of higher than the FT+50° C. to the FT+150° C. and the FT to the FT+50° C., two or more-pass rolling is carried out,
finish rolling is completed by setting the FT to equal to or higher than Ar₃ which is obtained from Expression (1), equal to or higher than TR which is obtained from Expression (2), and 1,100° C. or lower, then, water cooling is initiated within 3.0 seconds, an average cooling rate at the FT to 750° C. is set to 20° C./second or faster,
a dwell time at a temperature range of 750° C. to 600° C. is set to 5 to 20 seconds, and
an average cooling rate at a temperature range from 600° C. to a cooling stop temperature of lower than Ms which is obtained from Expression (3) is set to 20° C./second or faster, $$Ar_3 \, (°C.) = 901 - 325 \times [C] + 33 \times [Si] - 92 \times [Mn] + 287 \times [P] + 40 \times [Al] \qquad (1)$$

$$TR \, (°C.) = 800 + 700 \times [Ti] + 1000 \times [Nb] \qquad (2)$$

$$Ms \, (°C.) = 561 - 474 \times [C] - 33 \times [Mn] - 17 \times [Ni] - 21 \times [Mo] \qquad (3)$$

here, the respective element symbols in Expressions (1) to (3) indicate the amounts of the respective elements by mass %.

6. The method for manufacturing the hot-rolled steel sheet according to claim 5,
wherein the average cooling rate from the Ms to the cooling stop temperature of lower than the Ms is set to 80° C./second or faster.

7. The method for manufacturing the hot-rolled steel sheet according to claim 5,
wherein, after the completion of the finish rolling, water cooling is initiated within 0.3 seconds, and cooling, in which the average cooling rate from the FT to the FT −40° C. is 100° C./second or faster, is carried out.

8. The method for manufacturing the hot-rolled steel sheet according to claim 6,
wherein, after the completion of the finish rolling, water cooling is initiated within 0.3 seconds, and cooling, in which the average cooling rate from the FT to the FT −40° C. is 100° C./second or faster, is carried out.

9. The method for manufacturing the hot-rolled steel sheet according to claim 7,
wherein a step of carrying out cooling, in which the average cooling rate from the FT to the FT −40° C. is 100° C./second or faster, is carried out between rolling stands.

10. The method for manufacturing the hot-rolled steel sheet according to claim 8,
wherein a step of carrying out cooling, in which the average cooling rate from the FT to the FT −40° C. is 100° C./second or faster, is carried out between rolling stands.

* * * * *